United States Patent

[11] 3,599,001

| [72] | Inventors | Jerry A. Rolnik<br>Los Angeles;<br>Frank P. Ballantyne, Santa Monica; Robert H. Frels, Hawthorne, all of, Calif. |
|---|---|---|
| [21] | Appl. No. | 640,233 |
| [22] | Filed | May 22, 1967 |
| [45] | Patented | Aug. 10, 1971 |
| [73] | Assignee | Hughes Aircraft Comapny<br>Culver City, Calif. |

[54] MULTIFIELD SENSOR ARRANGEMENT
2 Claims, 6 Drawing Figs.

[52] U.S. Cl.................................................. 250/220,
250/203, 250/209, 350/96, 356/152, 250/227
[51] Int. Cl...................................................... G02b 5/14
[50] Field of Search................................................ 250/220,
203, 209, 211, 227; 350/96; 356/152

[56] References Cited
UNITED STATES PATENTS

| 2,714,327 | 8/1955 | Squyer et al.................. | 250/209 X |
| 2,855,539 | 10/1958 | Hoover, Jr..................... | 250/209 X |
| 3,041,011 | 6/1962 | Dhanes.......................... | 250/203 X |
| 3,110,816 | 11/1963 | Kaisler et al. ................. | 250/211 X |
| 3,268,185 | 8/1966 | Eckermann, Jr. ............. | 250/203 X |
| 3,370,293 | 2/1968 | Green............................ | 250/203 X |

*Primary Examiner*—James W. Lawrence
*Assistant Examiner*—C. M. Leedom
*Attorneys*—James K. Haskell and Bernard P. Drachlis ABSTRACT: The structure disclosed comprises a detector package to accomplish signatured radiation detection over a determined field of view without the complex scanning devices associated with prior art systems. The package comprises a central group of tracking detectors peripherally surrounded by a plurality of acquisition detectors arranged in close juxtaposition and electrical isolation from each other. The detectors may be mounted in association with a funnel structure to ensure radiation impingement on the detectors as well as elimination of detector edge distortion.

PATENTED AUG 10 1971 3,599,001
SHEET 1 OF 3
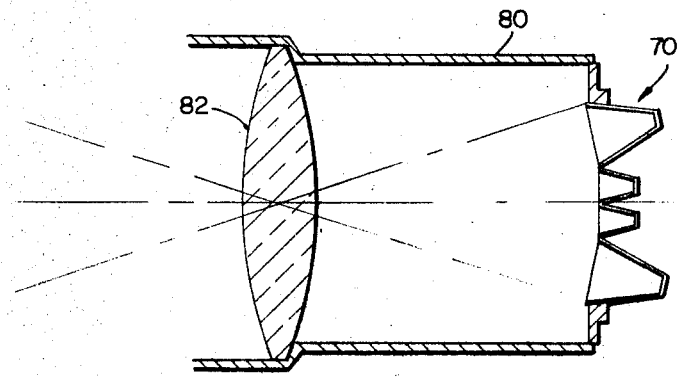
Fig. 5.
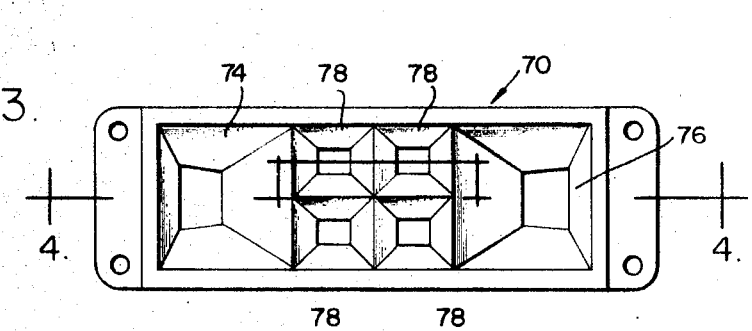
Fig. 3.
Fig. 4.
Fig. 1.
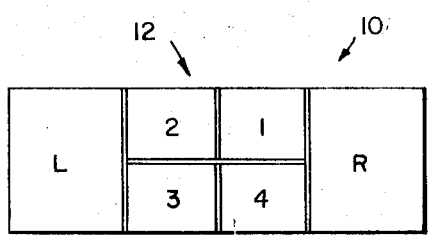
Jerry A. Rolnik,
Frank P. Ballantyne,
Robert H. Frels,
INVENTORS.
BY.
*Neil J. Dunnell*
ATTORNEY.

MULTIFIELD SENSOR ARRANGEMENT

The invention is directed to a multifield sensor arrangement providing both acquisition and tracking functions in a determined field of view in a nonscanning operative mode, thus eliminating independent acquisition and track devices or complex sensor motion structure characteristic of prior art arrangements.

All objects at a temperature level above absolute zero emit energy. The emitted energy usually has a characteristic pattern which can be used to detect, recognize and identify the emitting object. In effect, the energy pattern comprises an object "signature." A variety of sensing elements have been developed which, with appropriate circuitry, can be used to sense, that is, detect and if desired identify the energy-emitting object. In other systems using sensing elements energy from a controlled source such as a radar or laser source may be directed toward a specific object and the reflection of that energy from the object is then detected by the sensor or sensing element.

In the above examples, as well as other systems in current technology, the sensors may be used, not only to detect and identify a given object, but also to locate the object in space among other objects and then to continuously follow relative movement of the object. The sensor system thus "acquire" and "tracks" the object. This tracking information may be used to provide a position plot of the object and may be used to direct an intercepting projectile to the tracked object.

As will be well-known to those skilled in this art, the detection and acquisition of a signatured target or an object has heretofore required, in most missile applications, angular motion of the sensor through a determined search field. Most frequently, this motion was provided by mounting the sensor on a multigimballed platform and driving the sensor and its related optical focusing system through the determined field. Other prior art techniques involve separate systems to initially detect, acquire and identify the particular target or object after which an independent tracking system is used to provide a continuous hold or track on the acquired object and/or the directing of a missile or other object to the acquired target.

With the above in mind, it is a primary object of the invention to provide a composite sensor structure having juxtaposed but independent signal detection elements arranged to facilitate the selective detection of a particular signatured object in a determined field of view in a comparatively simple and facile manner.

It is a further object of the invention to provide a composite sensor structure as described which facilitates the detection, acquisition and identification of particular objects and, if desired, track the relative movement of that object.

It is yet a further object of the invention to provide a device of the type described that will provide an effective wide field of view commensurate with the multiple functions of detection, identification, acquisition and tracking without the need for separate acquisition and tracking system or, in the alternative, a complex driving platform for the sensor arrangement to view a determined scan area.

It is yet a further object of the invention to provide a sensor of the type described which will offer a reasonably wide field of view to accomplish both acquisition and tracking while maintaining a relatively fixed inertial reference.

These and other objects of the invention will become apparent in the course of the following description and from an examination of the related drawings, wherein:

FIG. 1 is a composite view of the physical arrangement of a simplified form of multifield-of-view sensor array pattern;

FIG. 3 is a front elevation view of a typical structure that may utilize a multielement sensor array pattern, similar to FIG. 1;

FIG. 4 is a sectional view taken approximately along line 4-4 of FIG. 3;

FIG. 5 is an optical telescopic arrangement, in vertical cross section, utilizing the structure of FIG. 3.

Figure 2:
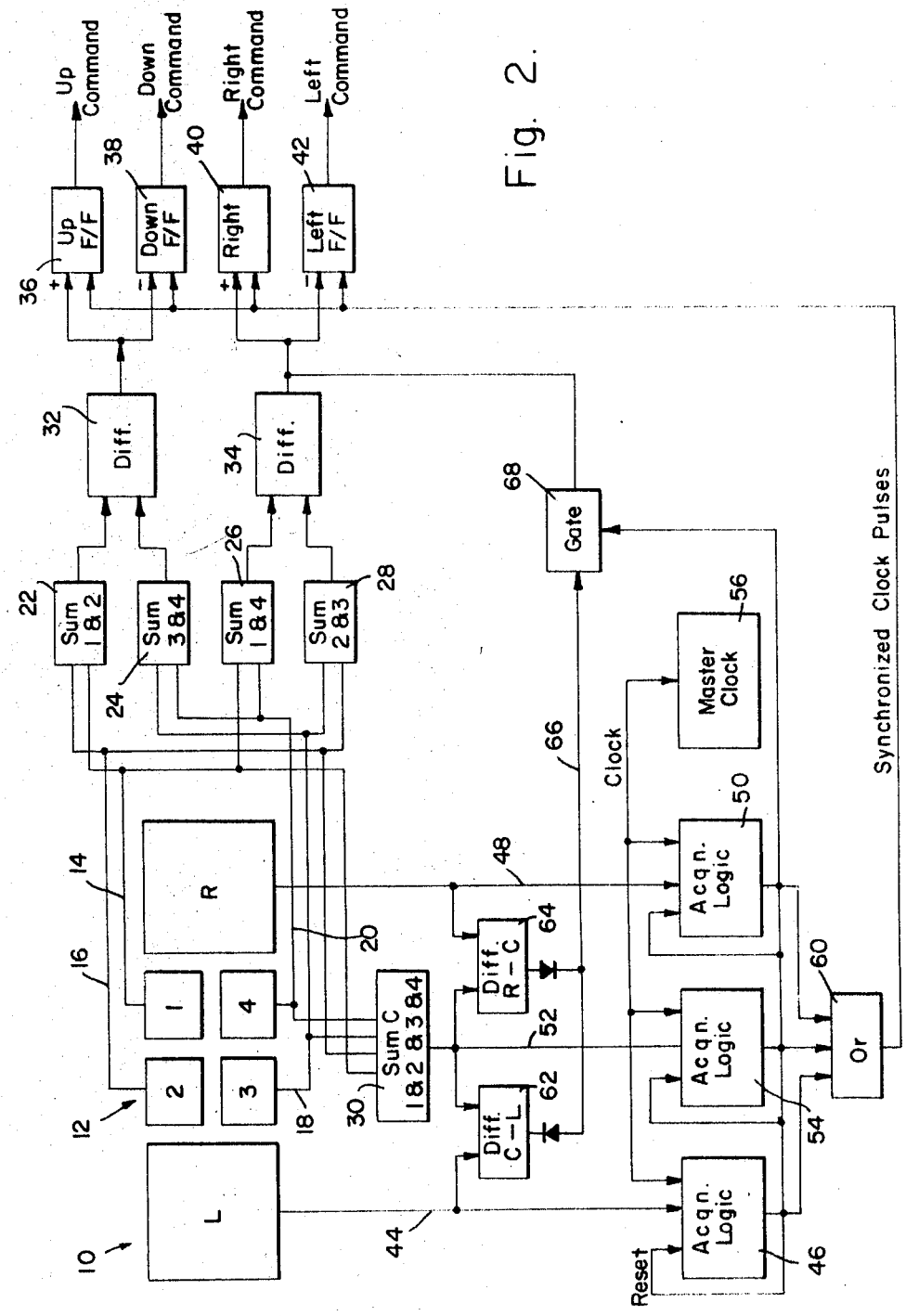
FIG. 2 is a typical logic circuit diagram which may be utilized with the sensor pattern of FIG. 1 to accomplish detection, acquisition and tracking functions.

Directing attention to the figures, a simplified, largely schematic view of the suggested sensor pattern array is shown in FIG. 1. The numeral 10 generally indicates the total pattern. In its simplest form the pattern comprises a left acquisition sensor, here designated L, and a right acquisition sensor, here designated R. As shown in the figures, the respective acquisition sensors are at opposed sides of the array. Centrally of the array a plurality of tracking sensors are disposed and indicated generally by the numeral 12. The tracking array 12 additionally functions as a central acquisition field as will hereinafter be described. In the form disclosed in FIG. 1, the tracking sensor array 12 comprises four sensors. An upper left sensor is indicated by the numeral 2 while a lower left tracking sensor is indicated by the numeral 3. Similarly, an upper right tracking sensor is indicated by numeral 1 while a lower right tracking sensor is indicated by numeral 4. It will be understood that both the tracking and acquisition sensors are in close juxtaposition though they are separated to a small extent so that each is electrically isolated from all adjacent sensors. Thus, electrical cross talk on faulty edge signals are inhibited.

Attention is directed to the logic diagram of FIG. 2 for the purpose of explaining sensor action and the control achieved thereby. Again, the total sensor pattern is generally indicated by the numeral 10 while the central acquisition field and tracking composite sensor package is indicated generally the numeral 12. The electrical isolation of the sensors is illustrated by the gaps therebetween as shown in FIG. 2.

In operation, it will be understood that the respective sensors provide an electrical signal output proportional to the quantity and quality of electromagnetic energy that may impinge thereon. With the sensor array 10 viewing a moving field containing a target object the respective sensors generate signals in response to the characteristic signature radiation being received from the target object. The tracking sensors 1, 2, 3 and 4 are electrically connected via lines 14, 16, 18 and 20, respectively, with summing devices 22, 24, 26 and 28. Additionally, lines 14, 16, 18 and 20 connect the respective tracking sensors with composite summing device 30. Summing device 22 totalizes signals generated by tracking sensors 1 and 2 and provides an output responsive to this total to differencing device 32. Similarly, device 24 sums the output signals of sensors 3 and 4 and also provides a responsive signal to differencing device 32. The sign and amplitude of the signal output from differencing device 32, therefore, depends upon whether the target signature is stronger in the upper half of tracking sensor array 12 or the lower half of sensor array 12. That is, signature intensity is greater in sensors 1 and 2 than it is in 3 or 4, or vice versa.

Similarly, devices 26 and 28 sum the intensity of the signals received at sensors 1 and 4, and 2 and 3, respectively. The output signals of summing devices 26 and 28 are carried to differencing device 34, the latter providing an output signal, responsive to the difference in signal intensity between the left- and right-half aspect sensors of the tracking sensor array 12.

The output of differencing device 32 indicates an up or down command depending upon the sign of the signal from that device. Similarly, the output of differencing device 34 is carried to command modules 40 and 42 to indicate a right- or left-command signal, again, depending on the sign of the output signal of the differencing device 34.

At the lower aspect of FIG. 2 identical acquisition logic devices are illustrated by the blocks 46, 54 and 50. Left acquisition sensor L is connected via line 44 to logic device 46. Similarly, acquisition logic device 50 is connected via line 48 to right acquisition sensor R. The summing device 30, in turn, is connected via line 52 to the central acquisition logic device 54. A master clock 56 provides an input signal to the acquisition logic devices 46, 54 and 50. The timing signal provided by clock 56, of course, corresponds to the known code "signature" of the type of target being sought. This master decoding signal, therefore, is continuously being fed to identical devices 46, 54 and 50, To illustrate the operation of the arrangement it will be assumed that an appropriate signal is received by left acquisition sensor L. The signal is, of course, transmitted via line 44 to acquisition logic device 46. If the signal as transmitted to the device 46 does not check with the signal concurrently received from master clock 56 that signal is disregarded and not passed through the system. On the other hand, assuming the signal received by sensor L has the proper signature, an identification pattern is set up in acquisition logic device 46 which opens the unit and transmits a signal to the OR gate 60 which passes that signal to the command modules 36, 38, 40 and 42, opening the latter and allowing them to respond to command signals from the devices 32 or 34 as well as signals received via gate 68. It will be apparent, therefore, that the logic devices 46, 54 and 50 inhibit any signal transfer and consequent control commands until a properly identified signal is received by one of the acquisition sensors.

Logic devices 50 and 54 act in identical mode to that described for logic device 46 except that the original acquisition signal would be received either by the right acquisition sensor R, or the acquisition signal could be received by the central tracking sensor array 12. Patently, logic devices 46, 54 and 56 operate in parallel during initial target search phase.

Once an identified signal is received by the left acquisition sensor L or the right acquisition sensor R, it is necessary to shift the signal to the central tracking sensor array 12. This control is provided by differencing devices 62 and 64 which receive signals from summing device 30 and left acquisition sensor L in the case of device 62 and right acquisition sensor R in the case of device 64. Differencing device 62 compares the signal from left sensor L with the sum signal from the tracking array 12 while device 64 compares the signal received from right acquisition sensor R with the signal received from the tracking array 12. In the event the differencing device indicates initial acquisition of the desired signature pattern occurred in left sensor L a negative signal is put out by device 62 which passes gate 68 via line 66 triggering appropriate action at left and right command modules 40 and 42. This action will shift the acquired signal to the central tracking array 12, which thereafter control command modules 36 to 42. In the event differencing device 64 indicates that the desired signature pattern was first received by right acquisition sensor R, a positive signal is put out by device 64 which passes gate 68 again to module 40 and 42 and an appropriate command is issued to center the central tracking array 12 about the received signature direction. There again, tracking function occurs as above described. If the target signature is first received in the array 12, the tracking function is immediately undertaken as above described.

Turning to FIGS. 3 and 4, detailed views of a "light pipe sensor mounting array" is illustrated and indicated generally by the numeral 70. The array 70 comprises a bracket 72 having enlarged truncated pyramidal cavities 74 and 76 at the left and right hand aspects thereof as seen in the figures. Centrally of the bracket 72, a plurality (here four) of smaller truncated pyramidal cavities 78, 78 are provided. At the base or central truncated portion of each cavity 74, 76 and 78 sensor devices indicated by the letters L, R and numerals 1 through 4, respectively, are provided. The sensor devices may be any appropriate type depending upon the spectral band of the energy wave to be detected. The surfaces of the cavities 74, 76 and 78 are energy reflecting and are angled relative to the line of sight of the entire sensor package so that energy striking the surfaces will be reflected to the sensor at the center of each individual cavity. Thus, all of the energy within the field of view of the detector array is captured and conveyed to one of the sensors while the sensors, per se, may be physically isolated to prevent electrical cross talk therebetween or confused signals at the juxtaposed edges of the exposed sensors. It will be noted that the energy-capturing cavities are illustrated in a preferred truncated pyramidal configuration. It will be apparent however that other geometric forms may be used, it only being necessary that substantially all of the cavity-captured signature radiation be reflected to the sensor at the cavity base. Additional advantages of the cavity structure described is that the sensor size may be reduced, with consequent reduced capacitance, faster response time and increased sensitivity.

It will thus be apparent that, regardless of geometric configuration, the respective cavities each form a funnel associated with a specific detector or sensor so that radiation telescopically entering a funnel will be channeled to the related detector for impingement thereon. It will also be noted that the respective funnels are in intimate edge relation so that all radiation directed toward the arrangement will strike at least one detector.

FIG. 5 is a fragmentary view of the light pipe-type array 70 mounted in an appropriate telescopic cylinder 80. The telescopic cylinder 80 defines the field of view of the light pipe array 70, and an appropriate lens 82 focuses the received radiation on the array 70.

Figure 6:
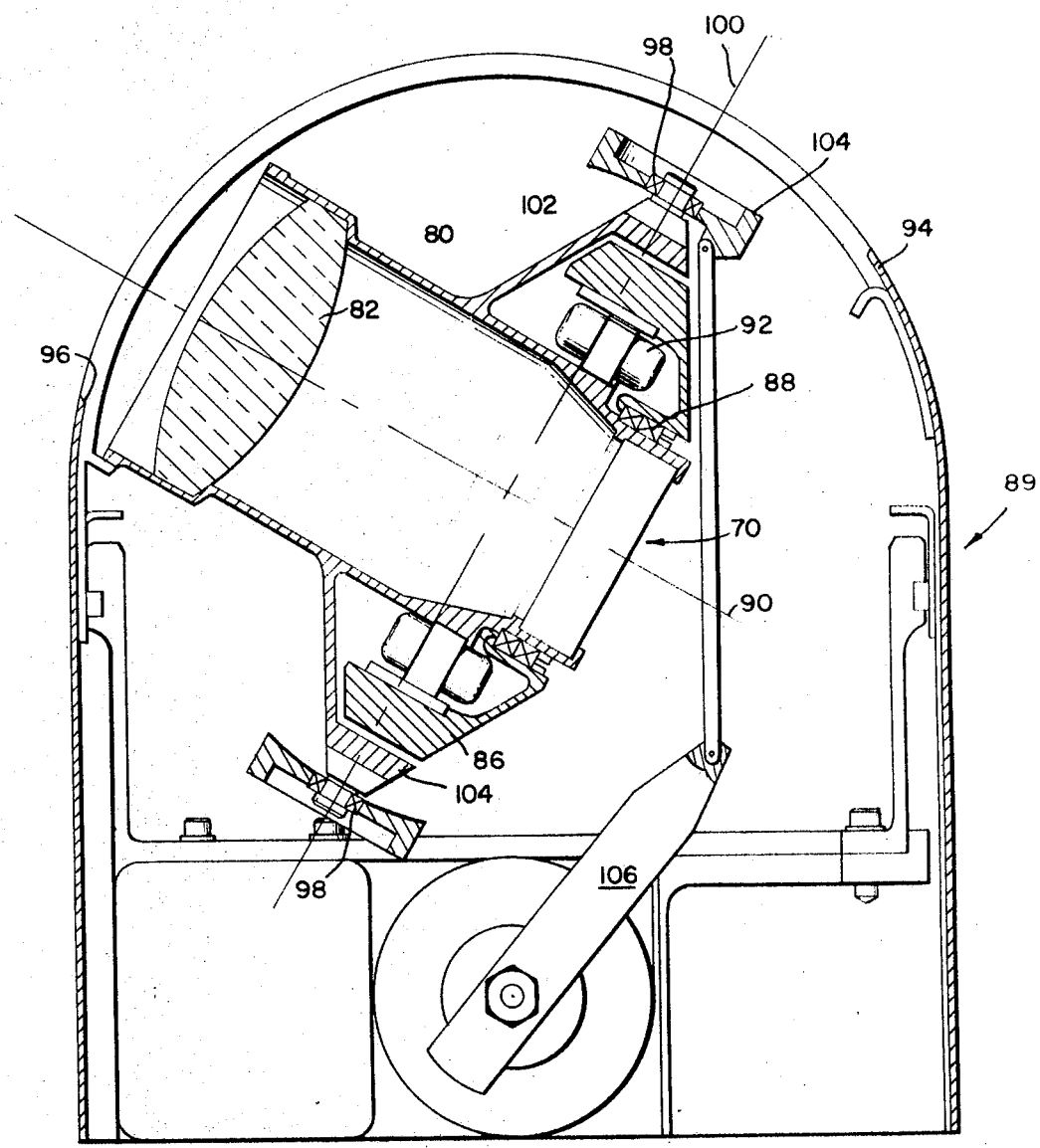
FIG. 6 is a vertical cross-sectional view of a typical mechanism or mounting platform which may employ the optical arrangement illustrated in FIG. 5.

FIG. 6 is illustrative of a typical mode of mounting of the structure shown in FIG. 5 in an appropriate housing that may be carried by an airborne vehicle such as an aircraft, missile, or the like. The arrangement comprises an outer or fixed housing indicated generally at 84 which may be secured to the carrying craft. The light pipe array is shown at 70 and its field-of-view cylinder at 80, as well as the focusing lens at 82. A gyrorotor rotation is provided at 86 having a bearing 88 which accommodates gyrorotor rotation about the axis 90 of the field of view. A motor-stator is illustrated at 92 providing motive source for rotation of the gyrorotor 86. The housing 84 is provided with a transparent dome 94 which has an opening from 94 to 96 to expose the field of view. Gimbal bearings are provided at 98, 98 to accommodate rotation of the entire arrangement about axis 100. The inner gimbal structure is indicated at 102. An outer gimbal is shown at 104. A torquing arrangement 106 may be provided to induce precessional movement of the gyro arrangement about axis 100 and compensate for movement of the carrying vehicle.

It will thus be apparent that the invention provides a nonscanning sensor array which offers a wide field of view accomplishing detection, acquisition and tracking functions needed in this type of system yet eliminating the necessity for complex mechanical structure to induce sensor sweep or motion to cover the desired field of view. While the arrangement illustrated is in a relatively simplified form it will be apparent to those skilled in the art that the arrangement may be expanded, especially, by the multiplication of acquisition sensors and parallel acquisition devices in virtually any geometric pattern desired about the central tracking sensor.

The invention disclosed is by way of illustration and not limitation, and may be modified in many respects all within the scope of the appended claims.

What I claim is:

1. In a radiation detector array to provide multiple channel detection, acquisition and tracking function;
    the combination of a pattern of detectors defining a first geometric configuration,
    another pattern of detectors defining a second geometric configuration,
    all of said detectors being electrically isolated from each other,
    said detectors being in adjacent juxtaposition to each other so that radiation impinging on the array will engage at least one of said detectors,
    the first mentioned geometric pattern of detectors being located in peripheral areas of the array,
    the second mentioned pattern of detectors being located in a central area of the array, each of said detectors having a wave-receiving funnel associated therewith and projecting forwardly of the respective detector,
each funnel being operative to direct radiation telescopically entering the respective funnel to the related detector,
the open ends of the respective funnels being in line edge relation with the adjacent funnels,
said open ends of the funnels associated with the detectors in the peripheral areas of the array being larger than the open ends of the funnels associated with the detectors in the central area of the arrays.

2. A radiation detector array according to claim 1, wherein the funnels form three-dimensional transitional surfaces from rectangular apertures to circular detector elements.